United States Patent
Koskela et al.

(10) Patent No.: US 6,786,972 B2
(45) Date of Patent: Sep. 7, 2004

(54) METHOD AND ARRANGEMENT IN A DRIVE DEVICE OF A ROD COATING STATION

(75) Inventors: Pekka Koskela, Pattaya (TH); Olli Koivisto, Jámsa (FI); Ari Rantanen, Koskenpaa (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/298,449

(22) Filed: Nov. 15, 2002

(65) Prior Publication Data

US 2003/0186751 A1 Oct. 2, 2003

Related U.S. Application Data

(63) Continuation-in-part of application No. 10/109,092, filed on Mar. 26, 2002, now Pat. No. 6,616,977.

(51) Int. Cl.[7] .............................................. B05C 11/02
(52) U.S. Cl. ..................... 118/110; 118/117; 118/118; 118/119; 118/123; 118/126
(58) Field of Search ................................ 118/110, 117, 118/118, 119, 123, 126; 427/359, 361; 15/256.5; 162/281; 101/120

(56) References Cited

U.S. PATENT DOCUMENTS

| 4,258,650 A | * | 3/1981 | McCrocklin et al. | ........ 118/101 |
| 5,284,229 A | * | 2/1994 | Logan et al. | ................ 118/107 |
| 5,490,020 A | * | 2/1996 | Albrecht et al. | ............ 360/96.3 |
| 6,387,180 B1 | * | 5/2002 | Takahashi et al. | ........... 118/216 |

FOREIGN PATENT DOCUMENTS

| EP | 1027471 | * | 8/2001 |
| GB | 2189269 | * | 10/1987 |

* cited by examiner

*Primary Examiner*—Laura Edwards
(74) *Attorney, Agent, or Firm*—Fildes & Outland, P.C.

(57) ABSTRACT

A method and arrangement using the drive device of a rod coating station to carry axial forces, in which the drive device includes at least a telescopic articulated shaft, at the first end of which is a changeable grooved rod and at the opposite end of which is the shaft of the drive motor. The rotation of the rod creates an axial force, which is cancelled by a counterforce from the articulated shaft side, which is brought to the end of the rod. The counterforce is brought to the rod through the articulated shaft from the drive motor side.

12 Claims, 5 Drawing Sheets

METHOD AND ARRANGEMENT IN A DRIVE DEVICE OF A ROD COATING STATION

CROSS REFERENCE TO RELATED APPLICATION

This application is a continuation-in-part of application Ser. No. 10/109,092 filed Mar. 26, 2002, now U.S. Pat. No. 6,616,977.

FIELD OF THE INVENTION

This invention relates to a method using the drive device of a rod coating station, in which the drive device includes at least a telescopic articulated shaft, at the first end of which is a replaceable grooved rod and at the opposite end of which is the shaft of the drive motor, and in which the rotation of the rod creates an axial force, which is cancelled out by a counterforce brought to the end of the rod at the articulated shaft side. In addition, the invention relates to an arrangement for implementing the method.

BACKGROUND OF THE INVENTION

Figure 2:
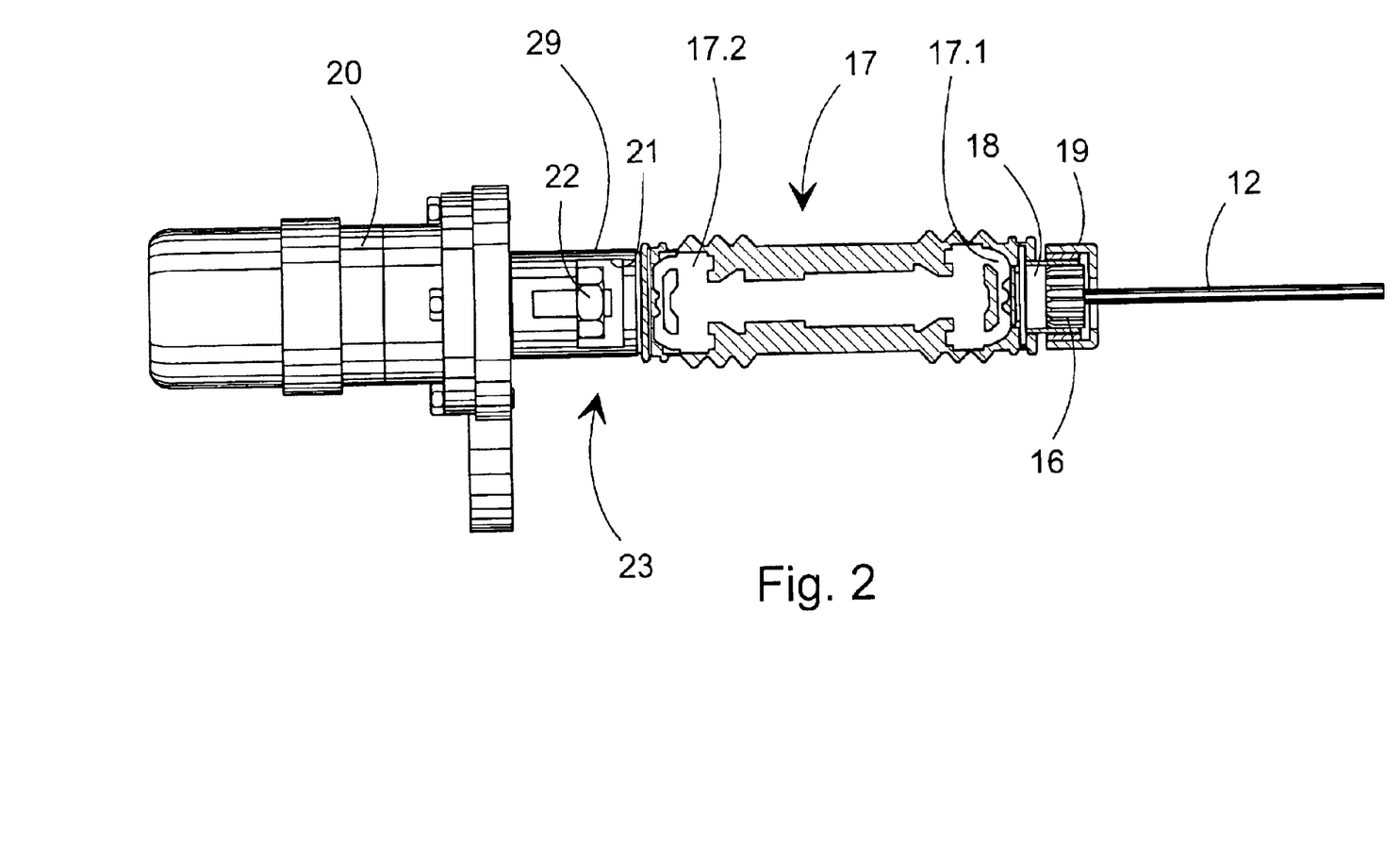
FIG. 2 shows a first embodiment of the invention, in partial cross-section.

U.S. Pat. Nos. 4,889,093 and 5,383,968 disclose rod coating devices suitable for the surface sizing and coating of paper. FIG. 2 of the latter publication shows that, in the device, the coating rod is set in a cradle, which is loaded and pressed shut with the aid of its own loading hoses. The loading hoses are supported on a unified profile rib, which is in turn supported at selected intervals on profiling spindles.

At the rod coating station, the grooved rod set in the cradle is rotated from its end by a special drive device, so that it regulates precisely, in a known manner, the amount of the coating, sizing, or similar substance to be spread on the surface of the wet web.

In accordance with the state of the art, at the end of the rod outside the cradle an end bearing is arranged, which receives the axial driving force caused by the rotation of the rod. The rod extends to the other side of the end bearing, where the end of the rod is fitted into a hole in a known type of attachment head of a telescopic articulated shaft, and is locked on one side by means of an Allen screw. Such an attachment is slightly eccentric and the rod 'dances' as it rotates. The opposite end of the articulated shaft is permanently connected to the motor's drive shaft.

The construction described according to the state of the art has several significant weaknesses in terms of structure and maintenance. Certain types of connection between the rod and the telescopic shaft result in some web breaks. The time for changing the rod at the spreading location is at least 10 minutes, during which at least five different components must be handled. Further, the installation time is increased by the limited rotation of the telescopic articulated shaft and the hydraulic drive motor, which require tools to bring them to the correct position. In the known solutions, there are also several components that wear and require maintenance, such as, for example, the telescopic articulated shaft, the connector sleeve, the shell of the end bearing, and especially the rod's rather weak support and end bearings. The lack of a bronze or needle bearing means that the telescopic articulated shaft has a short life, while eccentricity can appear in the joint between the application rod and the articulated shaft. Some fitting components may become detached during installation and fall into the machine. The delivery time is also lengthened by the cutting of the application rod to the desired length and machining both of its ends prior to delivery. If problems do not arise, the application rod must be changed on average about once a week.

SUMMARY OF THE INVENTION

The invention is intended to create a new type of method for using a rod coating station's drive device to carry the axial forces induced by the rod, as well as an arrangement according to the method for easily connecting an application rod to the drive device.

The characteristic features of the method for carrying the axial forces, using a drive device of a rod coating station, in which the drive device includes at least a telescopic articulated shaft, at a first end of which there is a changeable grooved rod and at an opposite end of which there is a shaft of a drive motor, and in which rotation of the rod creates an axial force, which is cancelled by a counterforce brought to an end of the rod on the side of the articulated shaft, is characterized in that the said counterforce is brought to the rod through the articulated shaft from side drive motor side.

The characteristic features of the arrangement using the drive device of a rod coating station, which drive device includes at least a telescopic articulated shaft, at a first end of which are arranged attachment members, to which is fitted a changeable grooved rod, and at an opposite end of which is fitted a shaft of a drive motor, is characterized in that a special quick attachment head, which is arranged to be detachable, is arranged at the end of the rod.

According to another embodiment, the rod at the end of the articulated shaft can be attached and detached entirely without handling loose components. Thus, the drawback of loose components or installation tools being able to drop into the device is also entirely eliminated. The use of this simpler and more compact connection construction allows attachment and detachment operations to be carried out very quickly.

The advantages gained with the aid of the invention include a more reliable connection between the rod and the telescopic shaft, so that the number of web breaks is reduced. In addition, the changing of the rod is substantially accelerated compared to the state of the art. When the rod is being changed, the number of components to be handled is reduced to three. The other features characteristic of the method and arrangement according to the invention appear in the accompanying claims and other advantages achieved with the invention are stated in greater detail in the description.

These and other features and advantages of the invention will be more fully understood from the following detailed description of the invention taken together with the accompanying drawings.

DETAILED DESCRIPTION OF THE INVENTION

Referring now to the drawings in detail, the invention deals with a rotating spreader rod drive device, which is used, for example, in a rod coating device suitable for the sizing or coating of paper. As such, the method and arrangement according to the invention can, however, be applied to different kinds of rod spreading devices.

Figure 1:
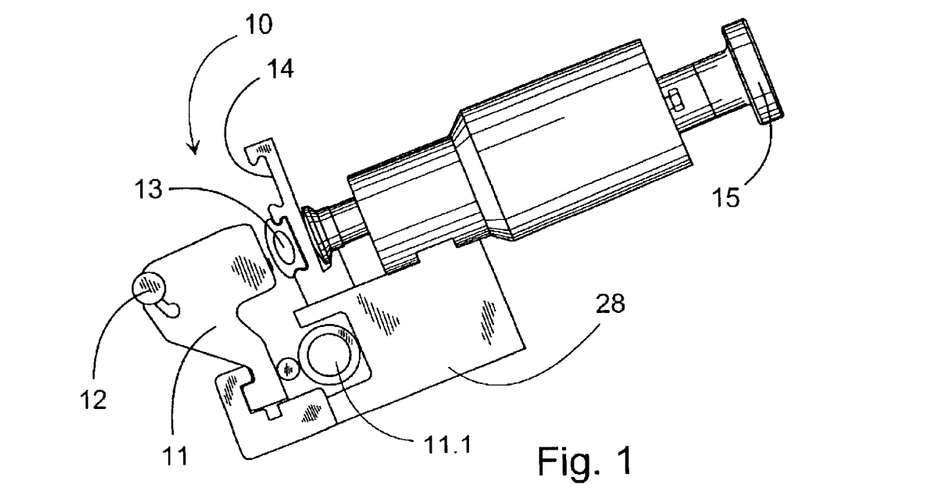
FIG. 1 shows a general schematic diagram of a rod coating device.

FIG. 1 shows one modern rod coating device 10. In this connection, reference can also be made generally to sizing, because what is in question is a thin layer (for example, 1–2 g/m$^2$, the solids content of the size being typically 8–10%).

The device 10 is to a great extent of the same type as that of the U.S. Pat. No. 5,383,968 referred to in the description of the state of the art. However, the cradle 11 of the rod 12 is attached by means of a quick attachment 11.1 to the frame 28 of the device 10. The profile rib 14 is adjusted to the desired profile using hand-wheels 15. The loading hose 13 pushes the cradle 11 towards the web supported by a roll (not shown). The rod 12 protrudes from the cradle 11 at least at one end, to which the drive device is connected. The rod's diameter can be, for example, about 10 mm and its rotation speed about 60 rpm.

FIG. 2 shows one first embodiment of the drive device of the rod coating station according to the invention, in which the application rod is marked with the reference number 12. The application rod 12 can have grooves, which are preferably spiral. By means of the spiral or other grooves, the coating or similar mass to be spread is applied evenly and thinly over the surface of the coating roller or similar (not shown).

According to one first preferred embodiment, a grooved shaft 16 is brazed to the end of the rod 12 at the drive device side, to form an attachment member. According to the embodiment, a sleeve 18 equipped with internal grooving (not shown) is fitted to the first end 17.1 of the articulated shaft 17 arranged on the end on the drive device side. The grooved shaft 16 brazed to the end of the shaft 12 can be pushed into the said sleeve 18, when their grooves meet and form a tight axial fit.

Figure 4:
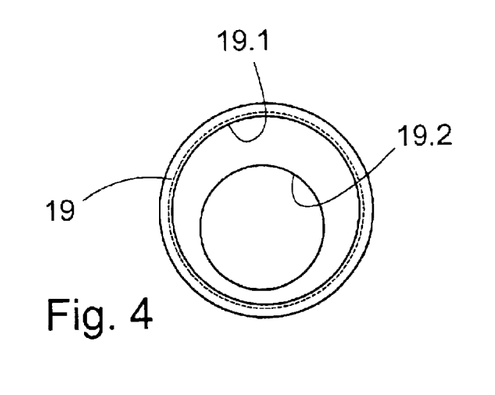
FIG. 4 shows a front view of the nut component used in one embodiment according to the invention.

The grooved shaft 16 is locked in place using a separate special nut component 19 shown separately in FIG. 4, which is preferably of, for example, bronze, by screwing it into an external thread (not shown) arranged on top of the sleeve 18. In the bronze nut 19, there is an eccentric hole, so that the concentrically rotating grooved shaft 16 is always supported on its inner surface, thus transmitting, according to the method according to the invention, the axial force arising from the rotation of the rod 12 to the telescopic articulated shaft 17 and from there to the drive motor 20. The said axial counterforce is thus taken through the articulated shaft 17 to the rod 12 from the drive motor 20 side and is thus created, for example, with the aid of the drive motor 20.

The telescopic articulated shaft 17 is, as such, conventional, but its attachment to the motor 20 is implemented with the aid of a special connector 23 at the opposite end 17.2 to the first end 17.1. In addition, it maximum length is set, so that axial forces can be transmitted through it. In the telescopic articulated shaft 17, there is a through hole 21 in the attachment sleeve 29 of the connector 23, in which a narrower torque plate 22 is set transversely. Thus, the shaft of the motor 20 extends through the attachment sleeve 29 to the torque plate 22, to which it is attached. The torque plate 22 can rotate to a limited extent in the opening 21, so that the articulated shaft 17 can rotate 20°–60°, depending on the dimensioning of the connector 23. A relatively small rotation is needed for the internal grooves (not shown) arranged in the sleeve 18 at the first end 17.1 of the articulated shaft 17 to be pushed, during installation, on top of the grooved shaft 16 brazed to the end of the rod 12. During operation, the shaft forces of the rod 12 travel from the inner surface of the bronze nut 19 to the circumference of the bronze nut and from there to the inner grooves (not shown) of the sleeve 18. The inner grooves (not shown) of the said sleeve 18 are at the first end 17.1 of the extreme length of the articulated shaft 17, through which the axial force is transmitted to the connector 23 of the drive motor 20 and from there to the flange of the drive motor 20.

In the embodiment shown in the previous FIG. 2, there is the problem of the special construction of the rod 12, due to the special grooved shaft fitting in this. FIGS. 3–6 show some arrangements implementing the method according to the invention, in which the rod 12 can be quickly locked onto the grooved shaft 16 or to a corresponding connector member.

Figure 3:
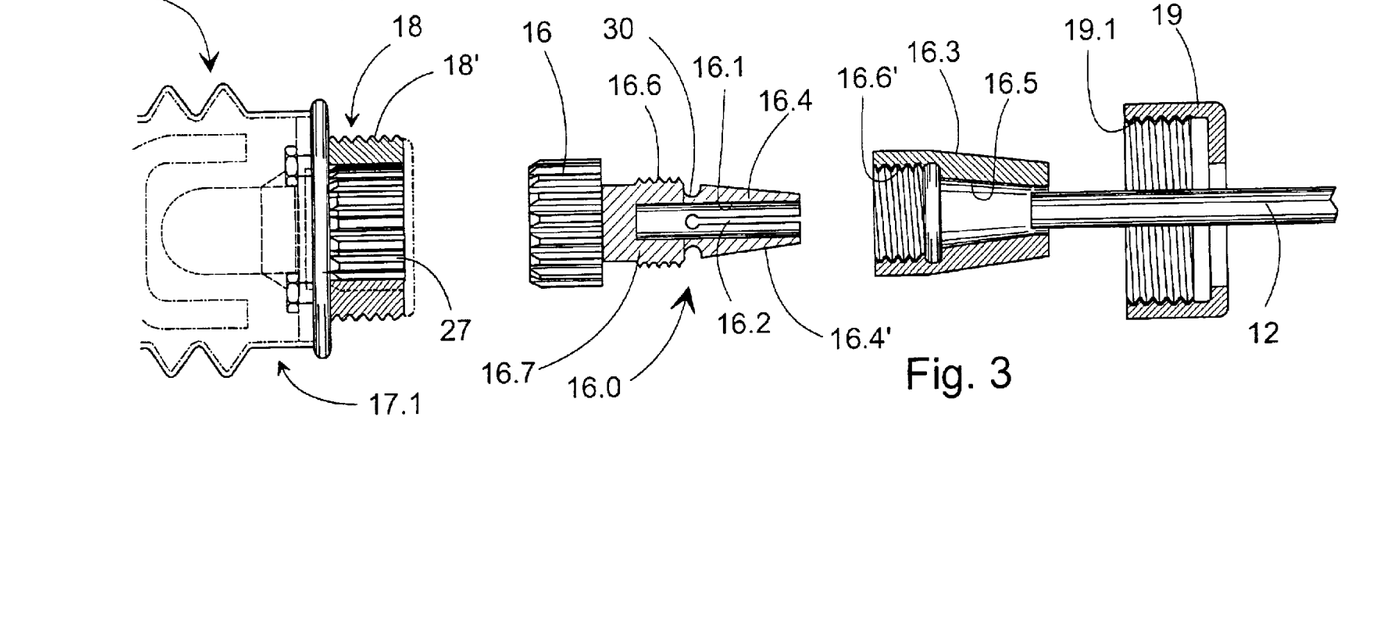
FIG. 3 shows an exploded view of a quick attachment arrangement according to the invention.

FIG. 3 shows one preferred embodiment of such a quick attachment arrangement. Quick locking is permitted by arranging a special detachable attachment head 16.0, equipped with a grooved shaft 16 or similar attachment member, at the end of the rod 12. The quick attachment head 16.0 of the rod 12 and the grooved shaft 16 itself are equipped with a through-drilled hole 16.1 that is the size of the diameter of the shaft of the rod 12. The quick attachment head 16.0 is formed of a conical part 16.4 narrowing towards its other end and of a cylindrical part 16.7, which has an external thread 16.6 of its cover, remaining between the conical part 16.4 and the grooved shaft component 16 or similar connecting member.

According to one preferred embodiment, an essentially axial slot 16.2 is arranged in the area of the conical part 16.4. In addition, a groove 30 that weakens the conical part 16.4 can be arranged in the outer circumference of the conical part 16.4, at the boundary of the conical part 16.4 and the cylindrical part 16.7. In addition, a separate conical sleeve 16.3, the internal conical surface 16.5 of which fits onto the external conical surface 16.4' of the conical part 16.4, is fitted to the quick attachment head 16.0. In the cylindrical part 16.7 and the conical sleeve 16.3 there are matching threads 16.6 and 16.6'. In addition, the outer surface of the conical sleeve 16.3 is preferably roughened (not shown), thus ensuring a good grip when tightening the sleeve in place and when detaching it using only hand force.

FIG. 4 shows the construction of the bronze nut 19 used in the embodiment described above. In the inner surface of the nut 19, an internal thread 19.1 is arranged, to secure it to the sleeve component 18, as well as an eccentric installation opening 19.2, which essentially runs through the grooved shaft 16. A surface remains outside this opening 19.2 and carries the axial forces of the grooved shaft 16 located centrally in the sleeve component 18, which forces cause the grooved rod 12 to rotate. In addition, the outer edge of the nut 19 is preferably slightly roughened, to create a good hand grip when tightening it, so that separate tightening tools are not necessarily required.

Figure 5:
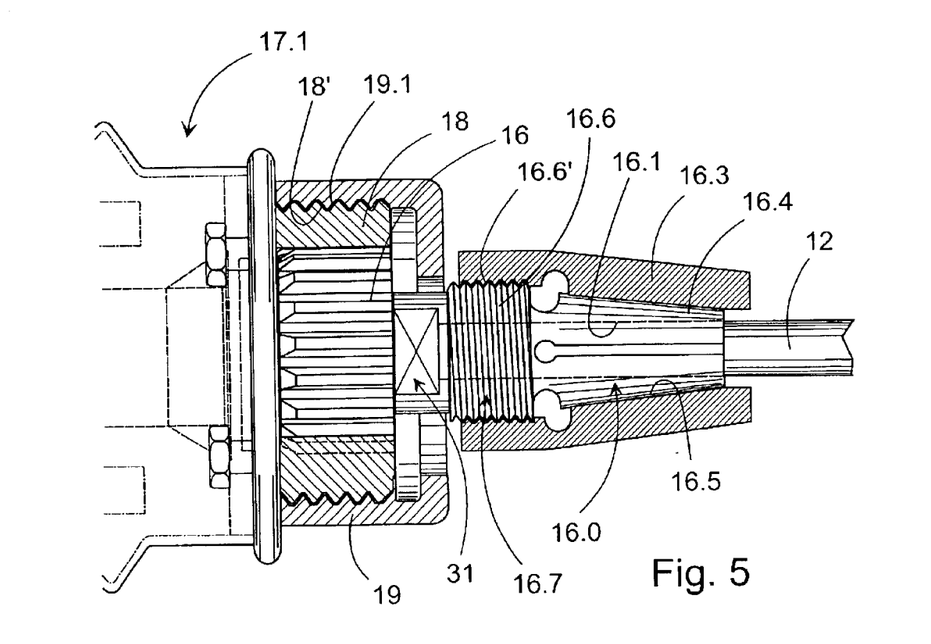
FIG. 5 shows a cross-section of an installed quick attachment head according to the invention.

FIG. 5 shows the assembly of the construction according to FIG. 3 described above installed. The rod 12 is then installed in the drilled hole 16.1 inside the quick attachment head 16.0 and the conical sleeve 16.3 is screwed tight onto the quick attachment head 16.0 on top of this. Thanks to the conical sleeve, the quick attachment head's 16.0 conical part 16.4, which has the slot and drilled hole that weaken it, clamps firmly onto the surface of the rod 12 and thus forms a tight attachment. The conical part 16.4 can also be without the said slot 16.2, in which case the drilled hole, made in the conical part and going to the rod 12, and the conical sleeve 16.3 must be fitted precisely to each other so that when the conical sleeve 16.3 is screwed in place onto the quick attachment head 16.0, it tightens the rod 12 firmly in the drilled hole 16.1 made for it.

Between the grooved shaft 16 and the cylindrical part 16.7, there is a machined flat surface 31, from which the quick attachment head 16.0 can, if necessary, be rotated to fit the grooved shaft 16 into the internal grooving 27 of the sleeve 18. The grooved shaft 16 is locked into position with the bronze nut 19 in the internal grooves 27 arranged in the internal sleeve 18, in the same way as described above.

Figure 6:
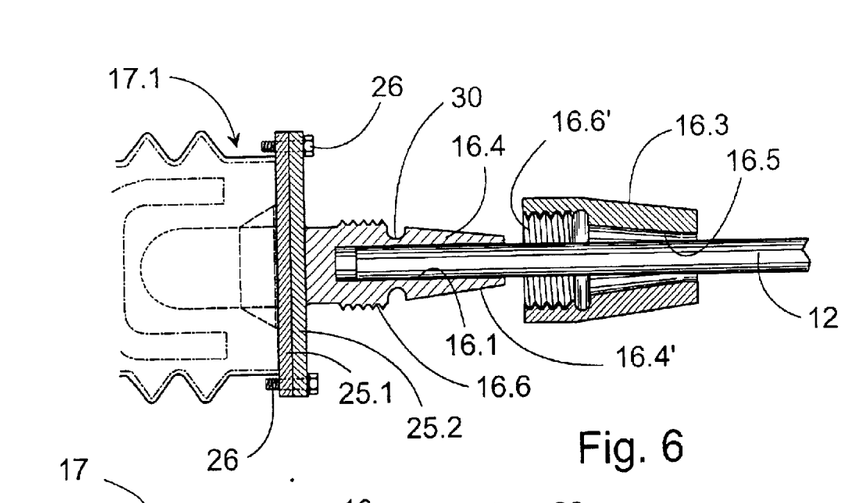
FIG. 6 shows a second embodiment of the connecting member according to the invention for connecting the telescopic articulated shaft and the rod to each other.

FIG. 6 shows an alternative embodiment of the grooved shaft 16, in which a circular flange surface 25.1, for example, the counter-piece to which a flange surface 25.2 is fitted to the quick attachment head 16.0, in place of the grooved shaft 16 shown in FIGS. 3–6, is arranged in the first end 17.1 of the articulated shaft 17. In the said flange surfaces 25.1, 25.2, drilled holes (not shown) can be arranged sufficiently close to each other in a circle, which will allow the said flange surfaces 25.1, 25.2 to be attached to each other in a balanced way, for example, by using bolts 26, or similar attachment pieces.

The rod 12 is changed in the arrangement according to the invention, using the grooved shaft 16 as an attachment member in the quick attachment head 16.0, as follows. First of all, the bronze nut 19 is opened, so that the sleeve 18 can be pulled off the end of the grooved shaft 16, as the telescopic part of the articulated shaft 17 gives way and can be pushed into itself. After this, the application rod 12 with the cradle are changed as a unit and the bronze nut 19 can be removed from the end of the rod 12 through the eccentric hole 19.2 through which the grooved shaft 16 runs.

The quick attachment head 16.0 can be removed from the end of the shaft of the rod 12 by rotating the conical sleeve 16.3 open, when the conical part 16.4 of the quick attachment head 16.0 will release its grip on the rod 12. The rod 12 can be pulled out of the drilled hole 16.1 of the quick attachment head 16.0 and the conical sleeve 16.3 can be removed from the rod 12 being changed and placed on the new rod 12, in such a way that the threaded end of the conical sleeve 16.3 faces that end of the rod 12 that will be attached to the quick attachment head 16.0. The rod 12 can be pushed to the bottom of the drilled hole of the quick attachment head 16.0 and the quick attachment head 16.0 can be tightened around the rod 12 using the conical sleeve 16.3 in manner described previously.

The bronze nut 19 is placed on the rod 12 from the said hole 19.2 in such a way that the open end of an imagined cylinder formed by the bronze nut 19 is towards grooved shaft 16 when rod 12 penetrates the hole 19.2 of the nut 19. The bronze nut 19 is screwed slightly on the outer thread 18' of the sleeve 18, so that the groove shaft 16 will be brought onto the same axial line as the sleeve 18. The articulated shaft 17 may need to be rotated slightly, depending on the position of the internal grooving 27 of the sleeve 18 in relation to the outer grooving of the grooved shaft 16, so that the grooves 16, 27 are brought into the correct position and the grooved shaft 16 can be pushed into the internal grooving 27 arranged in the sleeve 18. The bronze nut 19 can be screwed tight and locked into the internal groove 27 of the sleeve 18 of the grooved shaft 16.

Significant advantages over the state of the art are achieved with the aid of the method and arrangement according to the invention, for instance, in durability and changeability. The telescopic articulated shaft 17 is the only part of the arrangement subject to wear. By means of the straight construction without intermediate support beams the rod 12 and the articulated shaft 17 are made more parallel and concentric to each other. Maintenance is facilitated and the time for changing the rod 12 can be shorted from the present figure of about fifteen minutes to as little as three minutes, due to the limited free rotation of the drive shaft of the motor 20, so that special tools are not required to rotate the hydraulic motor 20 when changing the rod 12. In installation in a surface treatment machine, there are no parts that can become detached and possibly fall. According to the quick attachment solutions according to the new invention, the delivery time is considerably shorter, because all the necessary rods can be cut and installed in the manufacturer's service center. In the arrangement utilizing the method according to the invention, the end bearing required in the present concept is unnecessary, as the axial forces are carried through the wear-resistant surfaces of the new attachment. In addition, vibration and whip in the rod 12 can be minimized by using high technology needle bearings.

Figure 7:
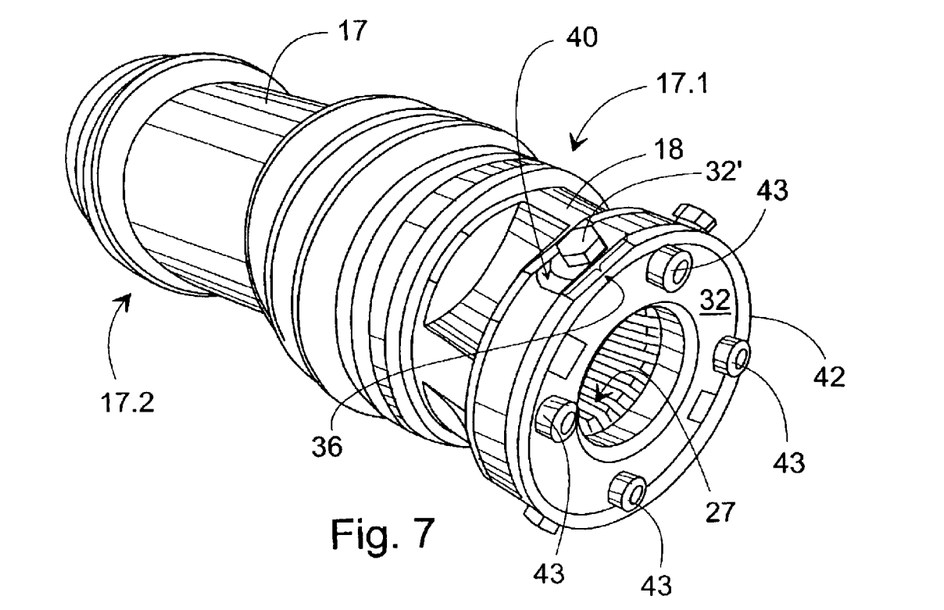
FIG. 7 shows a third embodiment of the arrangement according to the invention, seen at an angle from the side of the attachment members.
Figure 8:
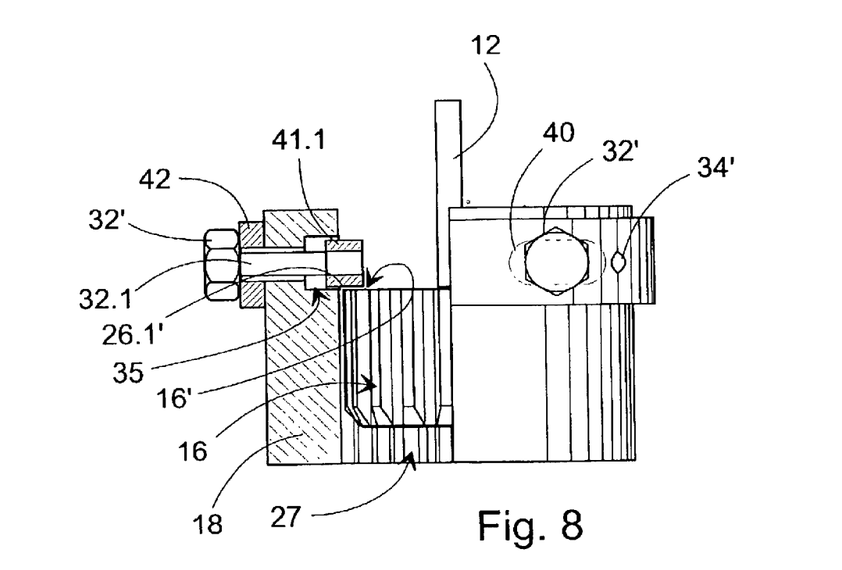
FIG. 8 shows the attachment members shown in FIG. 7, seen from above, in partial cross-section.
Figure 9:
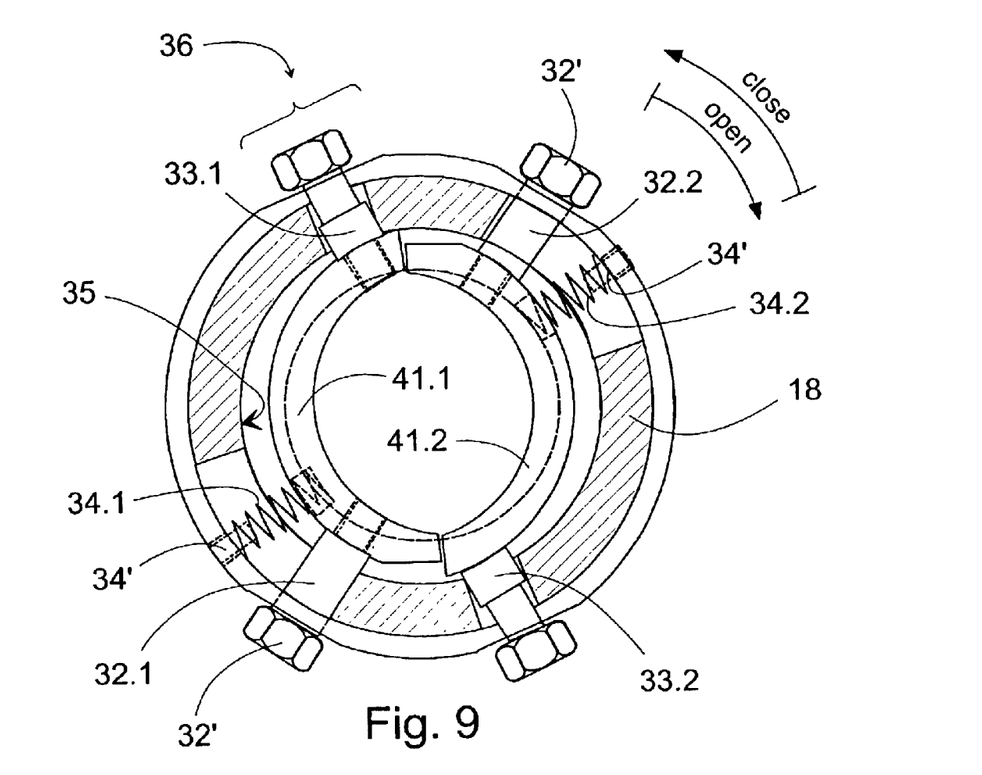
FIG. 9 shows the attachment members shown in FIG. 7, seen from the rod side, in partial cross-section.

FIGS. 7–9 show, as an example that is in no way restrictive, yet a third embodiment of the arrangement implementing the method according to the invention. FIG. 7 shows a attachment member, which in this case is formed by a sleeve component 18 in which there is axial internal grooving 27, and which is attached to the rod 12 side end 17.1 of the articulated shaft 17 arranged on the drive-device side of the rod coating device 10.

The attachment members are formed to create a construction that can be effectively cleaned preferably by flushing. This achieves a special advantage, for example, precisely in the environment of a coating device, as in that area possible paste splashes can result in a build-up of impurities. The attachment member includes not only the said sleeve 18, but also an synchronizing ring 42 fitted coaxially to its outer circumference. The synchronizing ring 42 rotates relatively to the sleeve 18, to a set extent, which is shown by the open/closed arrows in FIG. 9.

FIGS. 8 and 9 show partial cross-sections of the attachment member. A coaxial inner circumference groove 35 is arranged in the inner circumference of the sleeve 18, at a distance from the end from which the grooved shaft 16 is pushed into the sleeve 18 during its installation. However, the inner circumference groove 35 is also arranged so that the grooved shaft 16 fits inside the sleeve 18 over its entire axial length, in such a way that the grooving of the grooved shaft 16 corresponds to the internal grooving 27 of the sleeve 18 over the entire axial length. The inner circumferential groove 35 and the rod-side end 16' of the grooved shaft 16 are thus essentially next to each other in the cross-sectional plane of the sleeve 18.

The sleeve 18 can also be cut transversely at the transverse plane corresponding to the inner circumferential groove 35. The end flange 32 of the sleeve 18 (FIG. 7) has axially drilled holes, through which it is attached to axial screw holes (not shown) arranged in the body of the sleeve component 18. The attachment is made, for example, using four Allen screws 43, as shown in FIG. 7. The cutting line runs coaxially along the center-line of the synchronizing ring 42.

The grooved shaft 16 is locked in place, for example, using the separate locking pieces 41.1, 41.2 shown in FIGS. 8 and 9, which are of a shape and number that are in no way intended to be restricted by the example shown here. The locking pieces 41.1, 41.2 lie on the inner circumference of the sleeve 18, at a distance from the entry end of the grooved shaft 16, and lie axially before the inner grooving 27 of the sleeve 18, on the plane of the inner circumference groove 35. The locking pieces 41.1, 41.2 and the inner circumference groove 35 are arranged relative to each other axially in such a way that the profiles of the locking pieces 41.1, 41.2 fit the inner circumference groove 35.

Pin members 32.1-2, 33.1-2, and spring members 34.1-2 are arranged in connection with the locking pieces 41.1, 41.2, which in the case according to the example are elliptical pieces with a curved profile. The pins 32.1-2, 33.1-2 and the springs 34.1-2 are attached at their first ends to the outer circumference of the locking pieces 41.1, 41.2 in such a way that they are oriented radially towards the outer circumference of the sleeve 18. Further, the pins 32.1-2 and the springs 34.1-2 are at a distance from the first end of the locking pieces 41.1, 41.2 in the order of the locking pin 32.1-2 and at a distance from the spring 34.1-2. The pins 33.1-2, which are oriented radially from the outer circumference of the locking piece 41.1, 41.2 towards the synchronizing ring 42, are also arranged at the other ends of the said locking pieces 41.1, 41.2.

An opening 40 that is wider in the ring's 42 coaxial direction that in its axial direction 42, is therefore arranged in the synchronizing ring 42 for the said pins 32.1-2, 33.1-2. The width of the opening in the axial direction of the synchronizing ring 42 is arranged to allow the pins 32.1-2, 33.1-2 to be fitted through it. Further, the said openings 40 can be arranged to be at opposite sides of the circumference of the sleeve 19 to each other.

The outer circumference of the synchronizing ring 42, which is, for example, roughened to give an improved grip, has, for example, a circular shape except for the areas 36 (FIGS. 7 and 9) of the circumference, from which the pins 32.1-2, 33.1-2 arranged in the locking pieces 41.1, 41.2, or at least the second of the pins 32.1, 32.2 arranged in the locking pieces 41.1, 41.2, protrude through the openings 40. Thus, the embodiment shown in the figures has four of these areas 36, which are a located in the outer circumference of the synchronizing ring 42, at points corresponding to the openings in the sleeve 18 and synchronizing ring 42.

The areas 36 are essentially flatter than the rest of the outer circumference of the synchronizing ring 42. In addition, the areas 36 are arranged coaxially in such a way that the first end of an area 36 is farther than the other end of the area 36 from the outer circumference of the synchronizing ring 42 (i.e. the area 36 also rises at an angle). Thus, near the second end of the area 36 its surface merges with the outer circumference of the synchronizing ring 42 and extends for a distance to the said outer circumference (the distance being, for example, the thickness of the pin 32.1-2, 33.1-2). Alternatively, in the areas 36, the synchronizing ring's 42 outer circumference may also have protrusions towards the openings 40, which guide the pins 32.1-2, 33.1-2, and which extend radially outward from the outer circumference of the synchronizing ring 42.

The pins 32.1-2, 33.1-2 are widened at their ends opposite to the locking device 41.1, 41.2. According to one preferred embodiment, the pins 32.1-2, 33.1-2 can be formed from a threaded rod with a nut-shaped head, in which the nut 32' forms the said widening, the rod's thread allowing the pins 32.1-2, 33.1-2 to be secured to the holes, which have corresponding threads, drilled in the outer circumference of the locking devices 41.1, 41.2.

As already stated above, the synchronizing ring 42 is arranged around the sleeve 18 in such a way that it can be rotated coaxially by a set amount (FIG. 9, open/closed arrows). The rotation is limited by means of the openings 40 arranged in the synchronizing ring 42 and the pins 32.1-2, 33.1-2 running through them.

In the arrangement according to the invention, the rod 12 is changed as follows, using the grooved shaft 16 as the attachment member for the rod 12. The synchronizing ring 42 is rotated to move the pins 32.1-2, 33.1-2, which run through it move, essentially away from the first end of the coaxial opening 40 arranged in the synchronizing ring 42 and towards the second end of the opening 40 (FIG. 9, open arrow). The flat area 36 arranged in the synchronizing ring 42 that rises towards the ring's 42 circular outer circumference then forces the pin members 32.1-2, 33.1-2 radially outward. The contact between the pin members 32.1-2, 33.1-2, which run through the opening 40, and the synchronizing ring 42 is thus formed by means of the nut 32' at the end of the pin member 32.1-2, 33.1-2.

In addition to the above, as the spring members 34.1, 34.2 arranged next to the rising pin members 32.1-2, 33.1-2 are arranged in permanent contact with the inner circumference of the synchronizing ring 42, they bend when the synchronizing ring 42 is rotated. The bending is mainly in the middle part of the spring member 34.1, 34.2, because a reinforcing pin 34' is set for a distance inside the spring spiral, at its synchronizing-ring 42 end.

Because the pin members 32.1-2, 33.1-2 which rise positive guided outward are attached to the second end of the locking members, the locking members 41.1, 41.2 also move radially inside the sleeve 18. The locking members 41.1, 41.2 then move into the groove 35 arranged for them in the internal circumference of the sleeve 18. Once the locking members 41.1, 41.2 have withdrawn into the internal circumference groove 35, their internal circumference extends radially at most to a curve corresponding to the bottom of the corrugation of the internal grooving 27 of the sleeve 18.

The grooved shaft 16 is then released axially, allowing the sleeve 18 to be pulled off the top of the grooved shaft 16, because the telescopic section of the articulated shaft 17 gives way and can be collapsed. After this, the application rod 12 is changed, for example, in the manner described above.

The grooved shaft 16 of the new application rod 12 is brought axially into line with the sleeve 18 and the grooved shaft 16 is pushed into the inner grooving 27 arranged in the sleeve 18.

The synchronizing ring 42 can be rotated closed (FIG. 9, closed arrow), when the spring members 34.1, 34.2 attached to it move into place radially, pressing the locking pieces 41.1, 41.2 inward. The heads 32' of the pin members 32.1-2, 33.1-2 return to the radial level on the area 36, permitting the locking pieces 41.1, 41.2 to be pressed towards the imagined central axis of the sleeve component 18, to secure the grooved shaft 16 to the inner groove 27 of the sleeve 18.

In the retaining position, the locking pieces 41.1, 41.2 thus form an eccentric shape, so that the concentrically rotating grooved shaft 16 is always supported by the internal surface 41.1' of the locking pieces 41.1, 41.2, which thus, according to the method of the invention, transmits the axial force, created by the rotation of the rod 12, to the telescopic articulated shaft 17 and from there to the drive motor 20.

It should be noted that can also be a coaxial groove in the outer circumference of the grooved shaft 16, so that the said radial counter-surface 16' is formed in the axial direction of the sleeve 18, for example, in the center of the grooved shaft 16. In that case, the operating members described above are also at a point on the grooved shaft 16 corresponding to this groove, in order to form a locking surface permitting axial locking.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. An arrangement for a drive device of a rod coating station, which drive device includes at least a telescopic articulated shaft, at a first end of which is arranged an attachment member, to which is fitted a changeable rod, and at an opposite end of which is fitted a shaft of a drive motor, characterized in that a special quick attachment head, which is arranged to be detachable, is arranged at the end of the rod.

2. An arrangement according to claim 1, characterized in that to the quick attachment head are fitted, in order, an attachment member, a cylindrical part, in which an external thread is arranged, and a conical part narrowing towards the end of the cylindrical part, in which a drilled hole receiving the changeable rod and a separate conical sleeve are fitted to the cylindrical part, in which an internal thread adapted essentially to the external thread of the cylindrical part, and an internal conical surface adapted to an outer surface of the conical part.

3. An arrangement according to claim 2, characterized in that an essentially axial slot is arranged in the conical part.

4. An arrangement according to claim 1, characterized in that a sleeve member, in which a through hole is arranged, in which a transversely set torque plate is fitted to lock the shaft of the drive motor in place, is fitted to attachment means arranged in the opposite end of the articulated shaft.

5. An arrangement according to claim 1, characterized in that a grooved shaft is fitted to the quick attachment head to form the said attachment member.

6. An arrangement according to claim 1, characterized in that a flange member is fitted to the quick attachment head to form the said attachment member.

7. An arrangement according to claim 1, characterized in that a sleeve member, in which an external thread and internal grooving are arranged and a separate nut component for locking the quick attachment head axially, are arranged at the said first end of the articulated shaft to form the attachment member.

8. An arrangement according to claim 7, characterized in that an eccentric through hole of a grooved shaft is arranged in the separate nut arranged in connection with the quick attachment head.

9. An arrangement according to claim 6, characterized in that a flange member is fitted to the first end of the articulated shaft to form the said attachment member.

10. An arrangement according to claim 1, characterized in that a sleeve member is fitted to the first end of the said articulated shaft to form the attachment member, in which internal grooving is arranged, as well as radially-moving locking pieces to lock the quick-attachment head axially.

11. An arrangement according to claim 10, characterized in that an outer coaxial synchronizing ring is arranged in connection with the said sleeve member, in order to alter the position of the locking pieces.

12. An arrangement according to claim 10, characterized in that pin and spring members are arranged in connection with the said locking pieces, by means of which they are arranged operationally in connection with the synchronizing ring.

* * * * *